United States Patent [19]
Malone

[11] Patent Number: 5,915,945
[45] Date of Patent: Jun. 29, 1999

[54] INJECTED BAIT FISHING LURE HAVING A VENTURI TUBE INTERIOR

[76] Inventor: Albert V. Malone, 13195 County Rd. 4080, Rolla, Mo. 65401

[21] Appl. No.: 08/896,140

[22] Filed: Jul. 17, 1997

Related U.S. Application Data

[60] Provisional application No. 60/023,022, Aug. 5, 1996.

[51] Int. Cl.⁶ .................................................. A01K 85/00
[52] U.S. Cl. ......................................... 43/42.06; 43/42.02
[58] Field of Search ................................ 43/42.02, 42.06

[56] References Cited

U.S. PATENT DOCUMENTS

| | | | |
|---|---|---|---|
| 923,670 | 6/1909 | Lockhart | 43/42.06 |
| 1,250,913 | 12/1917 | McCormic | 43/42.06 |
| 2,538,459 | 1/1951 | Kasmeyer | 43/42.06 |
| 3,507,070 | 4/1970 | Rossello | 43/42.06 |
| 3,744,174 | 7/1973 | Lund | 43/42.06 |
| 5,097,620 | 3/1992 | Nietupski | 43/42.06 |
| 5,471,780 | 12/1995 | Hopson | 43/42.06 |

*Primary Examiner*—Michael J. Carone
*Assistant Examiner*—Fredrick T. French, III

[57] ABSTRACT

An artificial fishing lure having an elongated and streamlined body which is molded or fabricated of plastics, woods or other suitable materials so that an internal venturi tube passage is co-extensive and concentric in length with the body of the lure. When pulled through waters there is fluid flow through the venturi tube which creates a wake attractive to fish. An induction channel to the venturi throat is provided to create sonic effects and disturbances in the venturi discharge which enhance the attractiveness of the wake to fish. Baits may be distributed in the wake of the lure by elutriation from a cavity in the body and thence into the venturi tube throat via the induction channel.

3 Claims, 1 Drawing Sheet

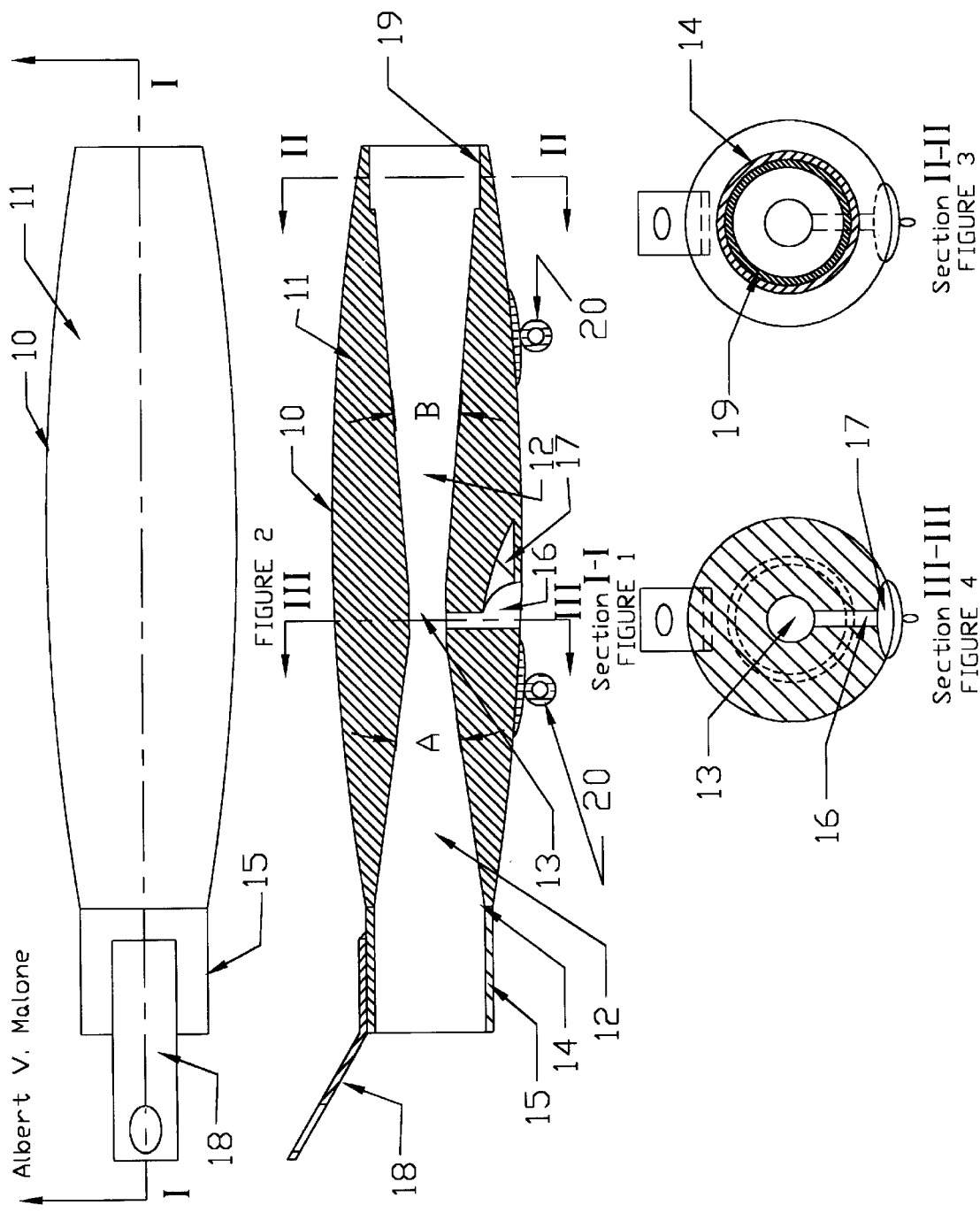

INJECTED BAIT FISHING LURE HAVING A VENTURI TUBE INTERIOR

CROSS REFERENCE TO RELATED APPLICATIONS

This application claims the benefit of U.S. Provisional Application No. 60/023,022, filed on Aug. 5, 1996.

BACKGROUND OF THE INVENTION

This invention relates to artificial fishing lures and particularly to fishing lures which when pulled through the water produce motions and actions which will excite and attract the fish to strike the lure.

An object of this invention is to provide a lure which when manipulated in the water will simulate the movement of natural bait sources while producing a wake which closely resembles the wakes generated by prey of the aggressor fish. Another object of this invention is to provide a lure which will generate a sonic action when manipulated through the water. A further object of this invention is to provide depth and motion control of the lure by a body feature which utilizes the effects of fluid flow as related to the Bernoulli theorem.

BRIEF SUMMARY OF THE INVENTION

This invention is directed to a fishing lure comprised of an elongated body with outer profile conforming generally to the shape of a fish. The body is molded or machined of material to provide an internal venturi tube axially aligned through the longitudinal center of the streamlined body section. A cylindrical nose section of inside diameter equal to the diameter of the venturi entrance is molded or machined as an integral part of the streamlined body section.

An outside entrance to the throat of the venturi may be used as an induction device for depth and motion control and as a means to inject scented bait into the discharge from the venturi. Also, aspiration through the outside throat entrance creates air bubbles in the discharge from the venturi tube. The trailing end of the lure body is constructed to allow the insertion of devices in the venturi discharge section so as to modify and enhance the attractiveness of the lure's wake to the fish.

BRIEF DESCRIPTION OF THE DRAWINGS

FIG. 1 is a sectional view taken on line I—I illustrating a fishing lure constructed in accordance with the principals of the invention.

FIG. 2 is a plan view illustrating the lure of FIG. 1.

FIG. 3 is a sectional view taken on line II—II of FIG. 1 and illustrating the trailing end of the lure and the discharge end of the venturi tube.

FIG. 4 is a sectional view taken on line III—III of FIG. 1 and illustrating the induction channel and throat of the venturi and a bait retaining cavity.

DETAILED DESCRIPTION OF THE INVENTION

Referring to FIG. 1 and FIG. 2 the fishing lure 10 of the invention includes a streamlined body 11 which may be molded or fabricated of a plastic, wood or other suitable material so an internal venturi tube passage 12 is co-extensive and concentric in length with the body of the lure. Generally, the angles of divergence A and B of the tapered sides of the venturi cones will not exceed 25 degrees for A and angle B may vary from 5 to 15 degrees. The throat diameter 13 may vary from half to one quarter the diameter 14 of the entrance to the upstream cone and the length of the throat section is generally equal to the throat diameter. These dimensions influence fluid flow rates through and from the discharge cone of the venturi and affects the characteristics of the wake produced by the effluent from the venturi as the lure is pulled through the water.

A cylindrical nose section 15 with inside diameter equal to that of the entrance to the upstream cone of the venturi provides stabilization of fluid flow to the throat 13 of the venturi.

Referring to FIG. 1 and FIG. 4 an induction channel 16 is linked to the longitudinal center of throat section 13 by a passage from the outside surface of the lure. The cross-sectional area of the channel at its entrance to the throat is not more than half that of the area of the cross section of the throat as represented by 13 of FIG. 4. A cavity 17 is molded or fabricated into the body of the lure so its opening is contiguous with the outside entrance to the induction channel. Scented bait may be inserted in this cavity. The bait is aspirated into the induction channel by the suction induced flow to the throat of the venturi and thence into the wake of the lure.

As the lure is pulled through the water by line linkage to attachment 18 on the lure, water flows through the venturi section and discharges to create a wake which is central to the normal wake caused by the motions of the outside surfaces of the lure. Velocity of fluid flow at the venturi throat will be greater than that in the entrance and exit cones of the venturi and in accordance with principles of the Bernoulli fluid flow theorem, pressure at the throat is less than the water pressure surrounding the body of the lure and water will flow from the outside of the lure through the induction channel to the throat. To simulate the natural darting and dodging of prey it is common to manipulate lures at different speeds in or on the water. Such variations in speeds of the invention lure will induce undulations in the pressure at the venturi throat and in the induction channel causing a sonic effect and entrainment of air in the venturi discharge which appear as bubbles in the wake to emulate the wake generated by prey of the fish.

The induction channel 16 may be positioned either on the top or bottom of the body of the lure in relation to the sectional view taken on line III—III of FIG. 1. The flow of fluid to the lower pressure area of channel 16 develops forces which move the lure up or down in respect to its buoyancy in the water. By selection of the channel position and the weight of the lure the level of submersion can be controlled as it is pulled through the water. The area of the channel entrance at the venturi throat may be varied also to affect the running levels of the lure.

Referring to FIG. 3 and line II—II of FIG. 1 a recess 19 is molded or milled into the trailing end of the lure so devices may be inserted or fastened to change the characteristics of the wake and the sonic effects of the fluid discharge from the venturi.

When fish are attracted to the lure's motion, wake or sonic action and attack the lure they become attached to the lure by ingesting or by impaling on hooks which are externally mounted to the lure at position 20. Hook positions, sizes and designs may be varied to adapt to different sized lures and species of fish.

While there has been shown and described a preferred embodiment of the fishing lure of this invention it is understood that changes in structure, materials, sizes and shapes can be made by those skilled in the art without departing from the invention. The invention is defined in the following claims.

I claim:

1. A fishing lure comprising:

A streamlined body section to resemble the profile of a bait fish;

An internal venturi tube passage which is co-extensive and concentric in length with the streamlined body section of the lure;

A cylindrical nose section with inside diameter equal to that of the entrance to the upstream cone of the venturi tube;

An induction channel arranged perpendicular to the venturi tube connecting the outside surface of the lure body to the longitudinal center of the throat section of the venturi;

A cavity for containment of scented bait arranged substantially parallel to the venturi tube which is molded or fabricated within the body of the lure so its opening is contiguous with the outside entrance of the induction channel to the venturi throat and so the bait is elutriated by suction into the water flow to the induction channel and thence to the venturi throat and into the wake of the lure, A recess in the trailing end of the lure body for the acceptance of devices to influence the characteristics of the venturi discharge wake;

Means for attaching a trolling line to the lure;

Means for attaching hooks to the outer surfaces of the body.

2. A fishing lure according to claim 1 which when pulled through waters causes fluid flow through the integral venturi tube so pressure at the venturi throat is less than the pressure at the outer surfaces of the lure body and as a result water is aspirated through the induction channel to the venturi throat, causing sonic effects and entrainment of air in the venturi discharge flow and producing a wake which in conjunction with the wake effects from the streamlined body, creates disturbances in the water which accentuate and enhance the similitude of travel by the prey of fish.

3. A fishing lure according to claim 1 whose running depth is influenced and varied by changing the induction channel location and the area of the venturi passage entrance to the throat of the venturi tube.

* * * * *